US006832300B2

(12) United States Patent
Naffziger et al.

(10) Patent No.: US 6,832,300 B2
(45) Date of Patent: Dec. 14, 2004

(54) METHODS AND APPARATUS FOR CONTROL OF ASYNCHRONOUS CACHE

(75) Inventors: Samuel David Naffziger, Fort Collins, CO (US); Donald C. Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 255 days.

(21) Appl. No.: 10/103,204

(22) Filed: Mar. 20, 2002

(65) Prior Publication Data

US 2003/0182507 A1 Sep. 25, 2003

(51) Int. Cl.[7] ............................................. G06F 12/00
(52) U.S. Cl. ...................................................... 711/169
(58) Field of Search ................................. 711/118, 167, 711/169

(56) References Cited

U.S. PATENT DOCUMENTS

| | | | |
|---|---|---|---|
| 3,918,033 A | 11/1975 | Case et al. | |
| 3,986,177 A | 10/1976 | Picquendar et al. | |
| 4,090,254 A | 5/1978 | Ho et al. | |
| 4,146,902 A | 3/1979 | Tanimoto et al. | |
| 4,590,589 A | 5/1986 | Gerzberg | |
| 4,612,448 A | 9/1986 | Strack | |
| 4,677,455 A | 6/1987 | Okajima | |
| 4,959,703 A | 9/1990 | Ogura et al. | |
| 5,321,285 A | 6/1994 | Lee et al. | |
| 5,324,966 A | 6/1994 | Muraoka et al. | |
| 5,375,215 A | * 12/1994 | Hanawa et al. | ............. 711/169 |
| 5,390,145 A | 2/1995 | Nakasha et al. | |
| 5,396,454 A | 3/1995 | Nowak | |
| 5,412,598 A | 5/1995 | Shulman | |
| 5,464,994 A | 11/1995 | Shinohe et al. | |
| 5,471,419 A | 11/1995 | Sankaranarayanan et al. | |
| 5,513,366 A | * 4/1996 | Agarwal et al. | ............. 712/22 |
| 5,525,820 A | 6/1996 | Furuyama | |
| 5,543,652 A | 8/1996 | Ikeda et al. | |
| 5,587,944 A | 12/1996 | Shen et al. | |
| 5,590,304 A | 12/1996 | Adkisson | |
| 5,689,458 A | 11/1997 | Kuriyama | |
| 5,813,022 A | * 9/1998 | Ramsey et al. | ................. 711/3 |
| 5,874,751 A | 2/1999 | Iwamuro et al. | |
| 5,910,738 A | 6/1999 | Shinohe et al. | |
| 5,914,503 A | 6/1999 | Iwamuro et al. | |
| 5,936,267 A | 8/1999 | Iwamuro | |
| 5,939,736 A | 8/1999 | Takahashi | |
| 5,968,153 A | * 10/1999 | Wheeler et al. | ............ 710/110 |
| 5,981,984 A | 11/1999 | Iwaana et al. | |
| 6,229,161 B1 | 5/2001 | Nemati et al. | |
| 6,327,645 B1 | 12/2001 | Hsiao et al. | |

FOREIGN PATENT DOCUMENTS

| | | |
|---|---|---|
| EP | 0 668 556 A2 | 8/1995 |
| FR | 2110326 | 6/1972 |
| JP | 57 208177 | 12/1982 |

OTHER PUBLICATIONS

Jun. 1998, F.Nemati and J.D. Plummer, *A Novel High Density, Low Voltage SRAM Cell with a Vertical NDR Device*, Center for Integrated Systems, Stanford University, Stanford, CA 94305.

F,Nemati and J.D. Plummer, *A Novel Vertical Storage SRAM Cell*, Student Paper written for Center for Integrated Systems, Stanford University, Stanford, CA 94305.

(List continued on next page.)

*Primary Examiner*—Matthew Kim
*Assistant Examiner*—Hetul Patel

(57) ABSTRACT

A processing system includes a cache controller for managing requests for data from a cache memory by a processor. The cache controller includes an access queue that holds requests for data pending asynchronous retrieval of the requested data from the cache memory, and an exit queue that holds the requested data retrieved from the cache memory until released to the processor. This queuing arrangement allows data lines to be retrieved from cache memory without a pipeline, while latencies are minimized.

17 Claims, 2 Drawing Sheets

OTHER PUBLICATIONS

F. Nemati and J.D. Plummer, *A Novel Thyristor–based SRAM Cell (T–RAM) for High–Speed, Low–Voltage, Giga–scale Memories*, Center for Integrated Systems, Stanford University, Stanford, CA, 1999.

1987, baliga, B.Jayant, *Modern Power Devices*, pp. 349–350.

Feb. 1980, Plummer, James D. and Scharf, Brad W., *Insulated–Gate Planar Thyristors: I–Structure and Basic Operation*, pp. 380–386.

1981, S. M. Sze, *Physics of Semiconductor Devices Second Edition*, John Wiley & Sons, pp. 198–209, 1981.

* cited by examiner

METHODS AND APPARATUS FOR CONTROL OF ASYNCHRONOUS CACHE

FIELD OF THE INVENTION

The present invention relates generally to processing systems and, more particularly, to cache control in a processor configured to access a cache asynchronously.

BACKGROUND OF THE INVENTION

Cache memory on a large multi-processor die can be allocated for a plurality of purposes, depending on roles assigned to the various on-chip processors. For example, one of the processors might be used as a special-purpose processor performing encryption and decryption while another is performing computations using a large database. In such case, the encryption processor would need very little cache memory to perform its function, while the computation-intensive processor would use as much cache as could be made available. Thus it frequently is desirable to allocate differing amounts of cache memory to different processors on the same chip.

Varying cache size, however, also can result in varying latency, that is, time needed to return data from cache memory in response to a processor request for the data. When cache memory allocated to a particular processor is increased, more time may be needed to locate and return to the processor a data line residing in a relatively remote cache location. Thus cache latencies typically are generated in varying lengths in response to requests by a processor, dependent on the location of a requested data line in the cache. When a cache memory is accessed, latencies of varying lengths also can arise if the cache voltage is different from the processor core voltage. Such a situation can occur when variable voltage is used as a power control mechanism.

A traditionally designed processor, however, accesses cache via a pipeline that is assumed by the processor to generate a fixed latency. Such processors are configured to wait during cache access requests, for a fixed time period corresponding to the assumed pipeline latency. Even if varying a cache size and/or cache voltage differential might result in significant numbers of shortened latencies, a conventional processor nevertheless would need to assume the pipeline latency to be a fixed maximum value in order to accommodate a range of possible cache latencies.

Such a processor frequently could be required to wait for cache data longer than actually necessary, thus slowing processor performance. Where an on-die cache is allocated in varying amounts to a plurality of on-die processors, accommodation of unnecessarily long processor waits for cache data also can result in cache under-utilization. It would be desirable, then, to allow a processor to adapt to cache latencies of varying lengths and to take advantage of relatively short latencies. Such capability would be particularly desirable in an single-die multiprocessing system in which on-die cache, a precious resource, is allocated according to respective needs of the processors.

SUMMARY OF THE INVENTION

In one preferred form, a processing system includes a cache controller for managing requests for data from a cache memory by a processor. The cache controller includes an access queue configured to hold requests for data pending asynchronous retrieval of the requested data from the cache memory. The cache controller also includes an exit queue configured to hold the requested data retrieved from the cache memory until released to the processor.

The above-described queuing arrangement allows data lines to be retrieved from cache memory without a pipeline, while latencies are minimized. More than one cache memory request can be outstanding at one time, and data requested from the cache memory can be returned to the processor in any order. Thus multiprocessor performance need not be slowed down by unnecessarily long waits for latencies. The above queuing scheme is simple yet tailored to facilitate asynchronous cache access in a multiprocessing environment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE INVENTION

The following description of embodiments of the present invention is merely exemplary in nature and is in no way intended to limit the invention, its application, or uses. Although embodiments are described herein relative to a multi-processor, the invention is not so limited and may be practiced in connection with other processing systems.

Figure 1:
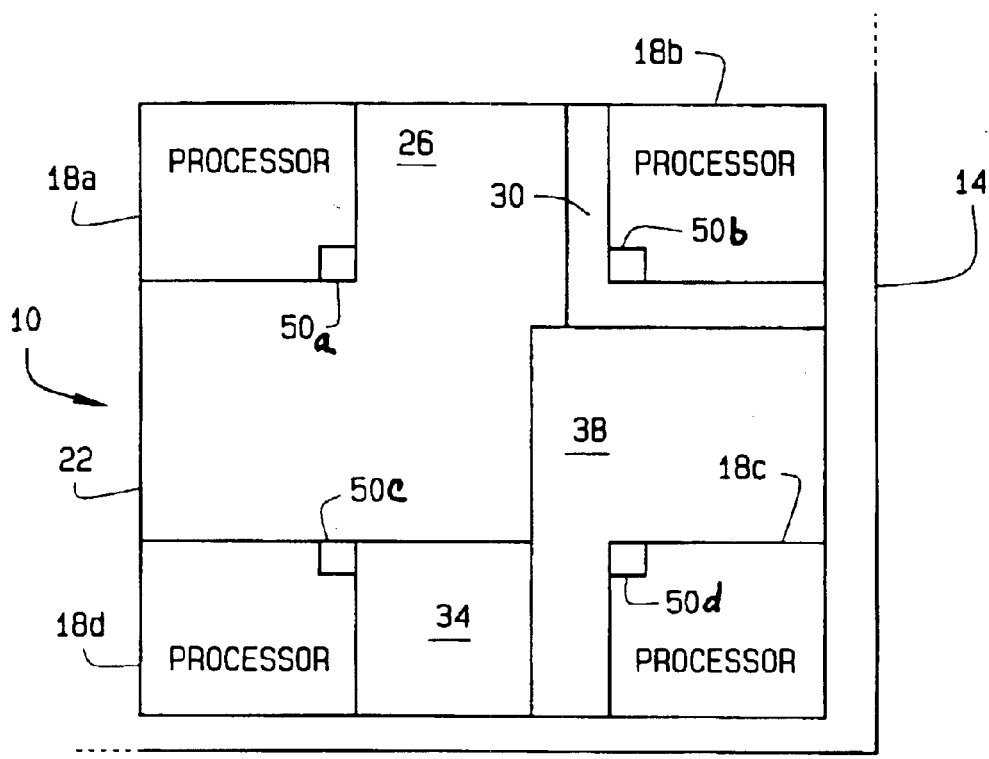
FIG. 1 is a diagram of an embodiment of a multi-processor having a cache memory shared among a plurality of processors.

A multi-processor is generally indicated by reference number 10 in FIG. 1. The multi-processor 10 is fabricated on a single die 14 and includes four processors 18a, 18b, 18c and 18d. The processors 18 share a cache memory 22 that is allocated to the processors as may be appropriate, for example, according to the processors' respective needs for cache usage. As shown in FIG. 1, an area 26 of the memory 22 is allocated for use by the processor 18a, an area 30 is allocated for use by the processor 18b, an area 34 is allocated for use by the processor 18d, and an area 38 is allocated for use by the processor 18c. Each processor 18a–d includes a respective cache controller 50a–d configured for managing processor 18a–d requests for retrieval of blocks or lines of data from the cache memory 22 area allocated to the particular processor 18a–d.

Figure 2:
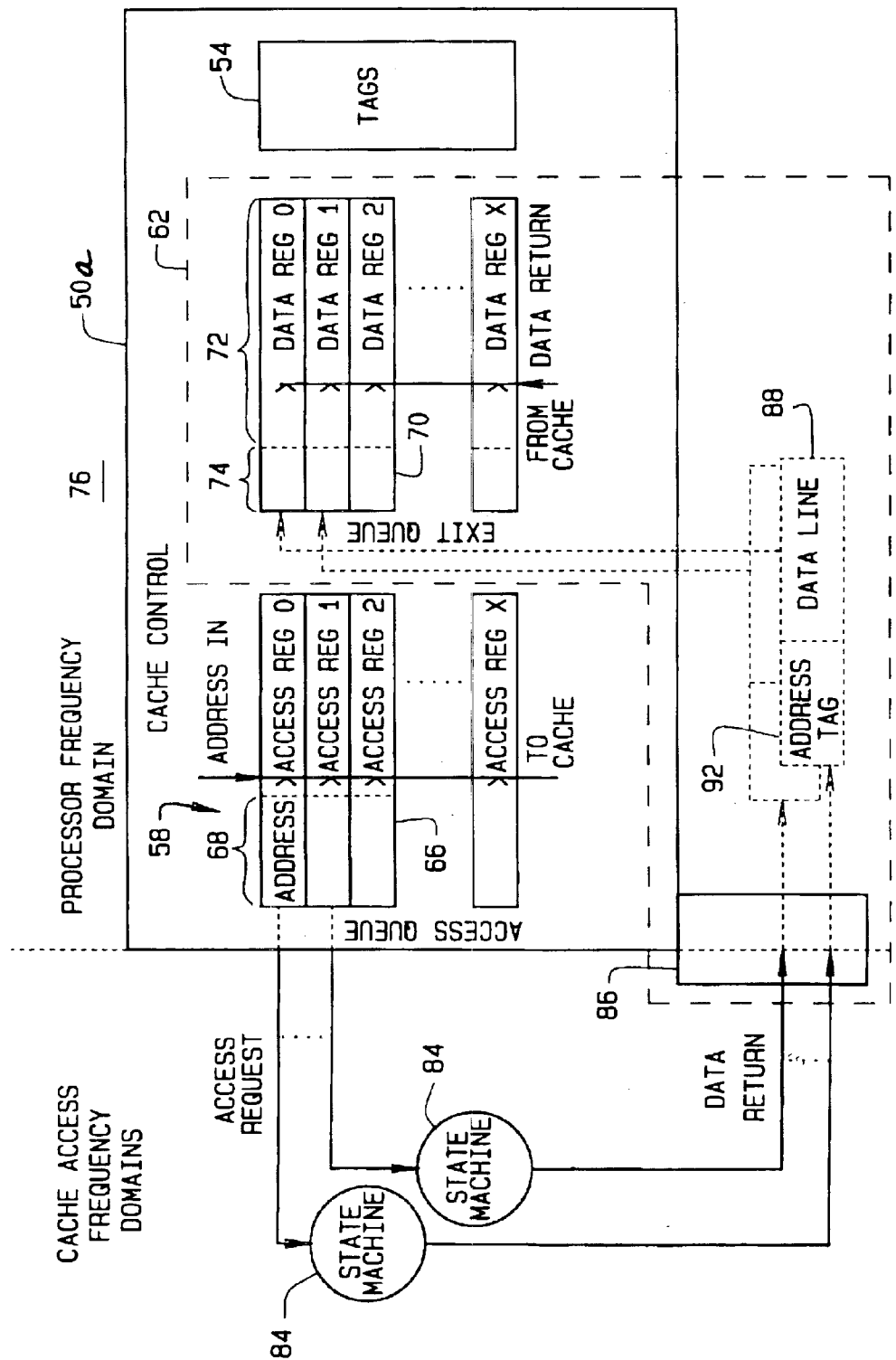
FIG. 2 is a diagram of an embodiment of a cache controller according to one embodiment of the present invention.

A cache controller 50a–d for example, the controller 50a of the processor 18a, is shown in FIG. 2. The cache controller 50a includes a tag array 54, a cache access queue 58 and a cache exit queue 62. As is known in the art, tag entries (not shown) in the tag array 54 point to lines of data stored in th cache area 26 (shown in FIG. 1) that have been retrieved in response to data requests by the processor 18*a*. The cache access queue 58 includes a plurality of access registers 66. Each access register 66 includes a bit group 68 for holding a cache memory 26 address. The exit queue 62 includes a plurality of data return registers 70. Each register 70 includes a bit group 72 for holding a line of data from the cache memory 26. Each register 70 also includes a bit group 74 for holding an address tag. An "address tag" is to be distinguished from an entry in the tag array 54 and shall be further described below.

The access registers 66 operate in one-to-one correspondence with the data return registers 70. It is contemplated, however, that access registers 66 may differ in number from return registers 70, and that at least one of the queues 58 and 62 may have only one register (66 or 70 as the case may be). As shall be further described below, at least one state machine 84 is associated with the queues 58 and 62 for processing a request for a data line from the cache 26. A reactive synchronizer 86 synchronizes return of requested data by the state machine 84 to the exit queue 62, as shall also be further described below.

In operation, the cache controller 50*a* synchronized to a clock of the processor 18*a*. That is, the cache controller 50*a* operates in a frequency domain 76 of the processor 18*a*. When the processor 18*a* issues a request for data from a main memory (not shown), the tag array 54 first is checked to determine whether the requested data is already in the cache memory area 26 (shown in FIG. 1). If the data is not in the cache area 26, the data request is forwarded to the main memory. When the requested data is returned from the main memory to the cache 26, the data is stored in the cache memory 26 and the tag array 54 updated to point to the newly stored data, as known in the art.

When the tag array 54 indicates that the requested data is stored in the cache area 26, the processor 18*a* initiates a sequence for retrieving the requested data from the cache memory 26. that is, the cache controller 50*a* pushes a cache memory 26 address for the requested data line onto the access queue 58. Specifically, the cache controller 50*a* loads the memory 26 address into the bit group 68 of a next-available access register 66 and points to the loaded access register 66 as the most recent request in the access queue 58. The address in bit group 68 of the access register 66 is driven to the cache memory 26, thus activating a self-clocked state machine 84 that operates asynchronously, i.e. outside the frequency domain 76 of the processor 18*a*.

The activated state machine 84 accesses the cache memory 26 at the driven address, retrieves a data line 88 from the driven address, and returns the requested line 88 via the reactive synchronizer 86 to the cache controller 50*a*. Specifically, the synchronizer 86 includes, for example, a latching stage (not shown) through which the line 88 is transmitted to synchronize return of the line 88 to the frequency domain 76 of the exit queue 62. The state machine 84 also returns an address tag 92 for the requested line 88 to the cache controller 50*a*. The address tag 92 is configured to be a unique identifier for each request in the access queue 58. Such identifier is, for example, a portion of the cache memory address that was driven to the cache memory 26 (e.g. a predetermined number of least significant bits of the driven address).

When the data line 88 is returned to the cache controller 50*a*, the accompanying address tag 92 is compared with the access queue register bit groups 68 to identify the access queue register 66 into which the cache 26 address for the data line 88 had been loaded as previously described. The line of data 88 and tag 92 then are loaded into bit groups 72 and 74 respectively of a corresponding data return register 70 in the exit queue 62. When a data line 88 has been returned to the exit queue 62, it can be accessed by the processor 18*a*. In the present embodiment, data lines 88 are returned to the exit queue 62 in an order based on relative latencies in retrieving the data. It is possible, then, for a data line 88 that has been returned to the exit queue 62 pursuant to a last-issued data request by the processor 18*a* to be first in the exit queue 62 to be released to the processor 18*a*.

Other embodiments may include logic providing for other orders in which requested data lines are returned to the exit queue 62. In such other embodiments, a state machine 84 may or may not be configured to return an address tag 92 for a requested line 88, and such tags, if returned, may or may not be utilized in ordering returns of data lines 88 to the exit queue 62. For example, in one alternative embodiment, data lines 88 are returned to the exit queue 62 in the same order in which they have been requested by the processor 18*a* (i.e. the same order in which they have been loaded into the access queue 58). In such an embodiment, returns of data lines into the exit queue 62 can be ordered without using address tags such as tags 92.

Figure 3:
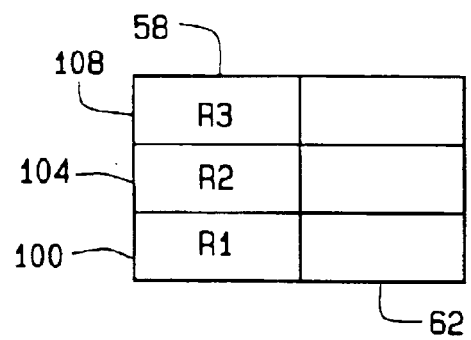
FIG. 3 is a diagram of access and exit queues of an embodiment of a cache controller.
Figure 4:
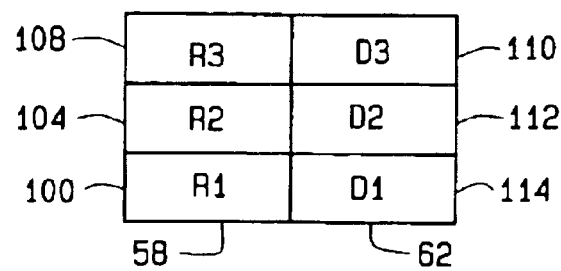
FIG. 4 is a diagram of the access and exit queues shown in FIG. 3.

Generally the cache controller 50*a* releases, to the processor 18*a*, retrieved data in the exit queue register 70 that corresponds to an access queue register 66 holding an address of data requested by the processor 18*a*. An illustrative sequence of loads to and releases from the queues 58 and 62 according to one embodiment shall now be described relative to a pair of simplified queues 58 and 62 in which three registers are shown in each queue. It is to be understood, of course, that the stacking of registers 66 and 70 as shown in FIGS. 2 through 4 is for illustrative purposes only. Correspondences and ordering among registers and queues can be maintained by pointers and other techniques. Thus registers and queues are not necessarily consecutively and/or contiguously configured as may be shown in FIGS. 2 through 4.

Referring to FIG. 3, as data requests R1, R2 and R3 are received sequentially by the cache controller 50*a*, they are loaded in the same sequence into three access queue registers 66, for example, registers 100, 104 and 108. The access queue 58 essentially, operates in a "first-in-first-our" (FIFO) manner. Thus R1 is first to be issued to the cache memory 26, and requests R2 and R3 follow in order to the cache 26.

When data lines 88 have been retrieved from the cache 26, they are placed into the exit queue 62, for example, as shown in FIG. 4. As one of lines D1, D2 and D3 (corresponding respectively to requests R1, R2 and R3) is received from the cache 26, the line is loaded into a corresponding one of data return registers 114, 112 and 110. Since data retrieval from the cache memory 26 is asynchronous, the order of arrival of lines D1, D2 and D3 from the cache 26 is not predetermined. In the present embodiment, lines D1, D2 and D3 are placed in the exit queue 62 in order of their arrival from the cache 26. (For simplicity, address tags 92 are omitted from FIGS. 3 and 4.) Each of the lines D1, D2 and D3 remains in the exit queue 62 until it is released to the processor 18*a*. As one of the data lines D3, D2 and D1 is released (in whatever order the data lines may be accessed by the processor 18*a*), the corresponding access register (108, 104 or 100) is again made available to hold new data requests.

It can be understood that, in the foregoing embodiment, the access and exit queues are configured to return data requested in cache access requests in an order based on relative latencies in accessing the data. A plurality of cache accesses can be outstanding at any one time, and cache requests are not necessarily satisfied in the same order in which they were issued by the processor. The cache control queues 58 and 62 allow cache data lines that have been quickly retrieved from cache to be readily available to the processor. A cache request that generates a relatively long latency does not slow down the satisfaction of other requests by the processor. Thus overall processor performance is enhanced.

The above-described queuing scheme is simple, quick and tailored to facilitate asynchronous cache access provided via the self-clocked state machine. The queuing arrangement allows data lines to be retrieved from cache memory without a pipeline, while latencies are minimized. Thus multiprocessor performance need not be slowed down by unnecessarily long waits for latencies. In a multi-processing environment in which cache allocations differ among processors, overall cache utilization also is improved.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A processing system comprising a cache controller for managing requests for data from a cache memory by a processor, the cache controller comprising:

an access queue comprised of a plurality of access queue registers configured to hold requests for data pending asynchronous retrieval of the requested data from the cache memory;

an exit queue comprised of a plurality of exit queue registers configured to hold the retrieved requested data until released to the processor; and a plurality of self-clocked state machines operating in one-to-one correspondence with pairs of the access and exit queue registers for the retrieving requested data from the cache memory asynchronously relative to a frequency domain of the cache controller.

2. The processing system of claim 1 wherein the retrieved data is loaded into the exit queue in an order determined by relative latencies in retrieving the data.

3. The processing system of claim 1 wherein the retrieved data is loaded into the exit queue in an order determined by the access queue.

4. The processing system of claim 1 wherein each of the exit queue registers is further configured to hold an address tag for identifying the corresponding access queue register.

5. The processing system of claim 1 further comprising a reactive synchronizer for synchronizing return of the requested data to a frequency domain of the exit queue.

6. The processing system of claim 1 wherein the cache controller is configured to hold a plurality of requests for data from the cache memory outstanding at one time.

7. A processing system comprising a plurality of processors and a cache memory allocated among the processors, at least one of the processors comprising a cache controller configured to control processor requests for retrieval of data from the cache memory, from which the requested data is retrieved asynchronously relative to a frequency domain of the requesting processor;

the cache controller comprising an access queue having a plurality of access registers in which a cache memory address of the requested data is placed and an exit queue having a plurality of data return registers in which the requested data is placed when retrieved from the cache memory; and a plurality of self-clocked state machines operating in one-to-one correspondence with pairs of the access queue and data return registers for retrieving the requested data from the cache memory asynchronously relative to a frequency domain of the cache controller;

wherein the cache controller is further configured to release, to the processor, the retrieved data in the data return register corresponding to an access queue register holding a cache memory address of the retrieved data.

8. The processing system of claim 7 wherein the cache memory address of the requested data is placed in the access queue upon issuance of a request by the processor.

9. The processing system of claim 7 wherein data requests are transferred from the access queue to the cache memory in an order in which the requests are placed in the access queue.

10. The processing system of claim 7 wherein the processing system is fabricated on a single die.

11. The processing system of claim 7 wherein the access and exit queues are configured to return retrieved data in an order based on relative latencies in retrieving the data.

12. The processing system of claim 7 wherein the data return register corresponds to the access queue register based on an address tag returned with the requested data.

13. A method for performing data retrieval from a cache memory in a processing system wherein a processor issues requests for data from the cache memory, the method comprising the steps of:

providing an access queue having a plurality of access registers an exit queue having a plurality of data return registers and a plurality of self-clocked state machines operating in one-to-one correspondence with pairs of the access queue and data return registers;

asynchronously retrieving data requested from the cache memory, said step performed using a one of the plurality of self-clocked state machines;

returning the requested data to one of the data return registers clocked with the processor, said step performed using a reactive synchronizer; and releasing the returned data to the processor from the one exit queue register.

14. The method of claim 13 wherein the step of releasing the returned data comprises releasing first to the processor a data line received pursuant to a last-issued data request to the cache memory.

15. The method of claim 13 wherein the step of releasing the returned data comprises releasing data lines to the processor in an order in which the data lines are requested by the processor.

16. The method of claim 13 further comprising the step of issuing data requests to the cache memory in order of receipt of the data requests from the processor, said step performed using the access queue.

17. The method of claim 13 wherein the step of releasing the returned data comprises releasing data lines to the processor in an order based on relative latencies in retrieving the data from the cache memory.

* * * * *